United States Patent [19]

Simonyi et al.

[11] Patent Number: 4,823,647
[45] Date of Patent: Apr. 25, 1989

[54] HYDROMECHANICAL TRANSMISSION SYSTEM

[75] Inventors: Sándor Simonyi, Salgótarján; László Törocsik, Budapest; György Válóczi; István Tóth, both of Salgótarján, all of Hungary

[73] Assignee: Csepel Autógyár, Szigetszentmiklós, Hungary

[21] Appl. No.: 146,465

[22] Filed: Jan. 21, 1988

[51] Int. Cl.⁴ .................. F02N 15/00; B60K 41/00
[52] U.S. Cl. .......................... 74/867; 74/866; 123/179 R
[58] Field of Search .......... 60/417, 415, 628, 626; 123/179 K, 179 F, 179 R, 179 A, 179 B, 179 J; 74/867, 7 R, 862, 861, 866

[56] References Cited
U.S. PATENT DOCUMENTS 3,926,075 12/1975 Kronstadt .................. 74/867
4,111,074 9/1978 Northup .................... 74/867
4,487,173 12/1984 Maucher et al. ............ 123/179 J

FOREIGN PATENT DOCUMENTS 0058154 4/1984 Japan ...................... 74/179 J

Primary Examiner—Dirk Wright
Assistant Examiner—William Gehris
Attorney, Agent, or Firm—Schweitzer & Cornman

[57] ABSTRACT

An arrangement is disclosed for push-starting of road vehicles of the type having an internal combustion engine and an automatic hydrodynamic transmission provided with a friction clutch, shift gears and a solenoid valve system for controlling the transmission, and where the vehicle is provided with a compressed air system for conventional uses, such as braking. A hydropneumatic actuator is provided for pressurizing the transmission system by means of stored compressed air. A manual control switch enables the push-start control. Thereafter, when the vehicle is pushed at a sufficient speed, a speed sensor activates the hydropneumatic actuator, engages a selected set of transmission gears, and engages the friction clutch, allowing the engine to be driven through the wheels of the vehicle. A second speed sensor, disables the push-start system when engine speed rises to a level indicating successful starting.

3 Claims, 2 Drawing Sheets

HYDROMECHANICAL TRANSMISSION SYSTEM

FIELD OF THE INVENTION

The present invention relates to a hydromechanical transmission system, particularly a hydromechanical transmission system which enables push-starting a vehicle equipped therewith.

BACKGROUND OF THE INVENTION

Road vehicles, such as automobiles having a standard mechanical transmission can be started from a standstill, with the motor not running, but the ignition being turned on, by pushing or pulling the vehicle while the transmission is in low gear but is disengaged by means of a clutch. When the pushed or pulled vehicle reaches a sufficient momentum, then the clutch is engaged and the motor of the vehicle becomes turned on. Throughout the specification and the claims this mode of starting the engine of a vehicle is referred to as "push starting".

In hydraulic transmissions a liquid or defined pressure must be available for the throwing into gear of the hydraulic converter, the friction clutch and the individual gears. This pressure is provided by a pump to automatic transmission. However, liquid is delivered by the pump only with the engine running. Therefore the engine cannot be push started in vehicles equipped with hydraulic transmissions.

This problem has been solved by a number of highly reputed manufacturers by installing a second pump to the drive-out shaft of the automatic transmission, which supplies the hydraulic liquid during push starting the engine. However, this solution has the disadvantage of the requirement for and costs of extra parts for this purpose.

DESCRIPTION OF THE INVENTION

The object of our invention is to find a more simple solution for the above problem as applicable to a majority of vehicles. Heavy vehicles are generally provided with a compressed air system which stores a certain amount of energy at all times. By the use of this energy the pressure required for the actuating of the transmission during push starting can be produced in the hydraulic system of the automatic transmission.

Accordingly, the invention comprises a hydraulic transmission system for the push starting of the engines of road vehicles having an internal combustion engine coupled to an automatic hydraulic transmission having a hydraulic converter, a friction clutch and gears controlled by an electromagnetic valve system, and a compressed air system including a compressed air container. The system includes a hydropneumatic cylinder with its hydraulic side connected directly to the supply side of the hydraulic armatures of the electromagnetic valve system of the automatic transmission, and with its pneumatic side connected to the compressed air system of the vehicle through an electromagnetic valve. The solenoid of this electromagnet is connected to the output of a control unit, and the other outputs of this unit are connected to the solenoids of electromagnetic valves for the closing of the friction clutch, of the automatic transmission, and that for the gears, and an electric hand-operated switch is connected to the input of the control unit.

According to an embodiment of the invention the crankshaft of the engine is connected to an angular velocity measuring sensor connected to one of the inlets of a control unit.

According to another embodiment of the invention the output shaft of the automatic transmission is connected to an angular velocity measuring sensor which is connected to a further input of the control unit.

DESCRIPTION OF THE DRAWING

The invention is disclosed in more detail with reference being had to the drawing wherein.

DETAILED DESCRIPTION OF THE INVENTION

A bus for city use, with an automatic transmission having three forward gears, was adapted for push starting in accordance with this invention. The engine can be push started with such an automatic transmission when the second gear is thrown in.

The gear selected for push starting the engine depends on the number of forward gears of the automatic transmission. At a too low gear choice, undue friction between the tires and the road surface doe not permit the turning of the engine's crankshaft.

Figure 1:
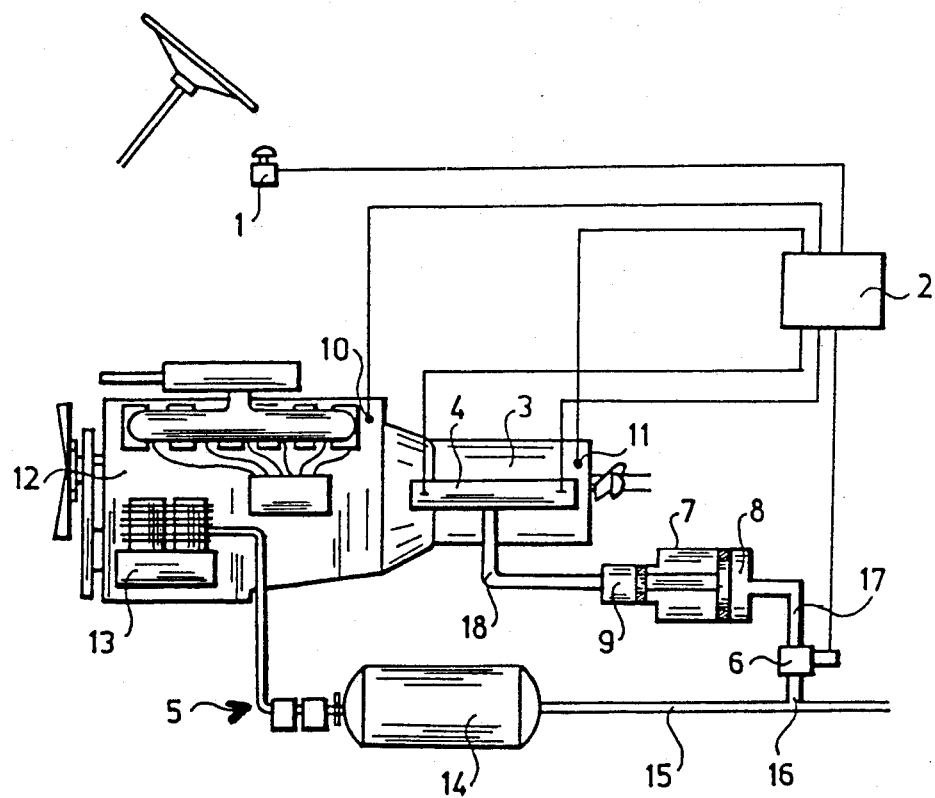
FIG. 1 is the schematic diagram of the transmission system.

As shown in FIG. 1, the bus is powered by an engine 12 that is a six-cylinder diesel engine. The automatic hydromechanical transmission 3 is connected to the engine 12. The individual gears of the automatic transmission 3 are connected to the crankshaft of the engine 12 through a hydraulic converter, and the hydraulic converter can be shorted by an integral friction clutch. The switching of the gears of the hydraulic converter and friction clutch is controlled by an electromagnetic valve system 4 provided with hydraulic armatures supplied by hydraulic liquid by a pump built into the automatic transmission 3.

A compressed air system 5 is provided for actuating the brakes and other devices of the bus. The compressed air system 5 is supplied by compressed air delivered by a compressor 13 driven by the engine 12. The air delivered by the compressor 13 is stored in an air container 14. An outlet air pipe 15 of the air container 14 is outfitted with a T pipe connector 16. (Other portions of the compressed air system 5 are not shown, as they are not pertinent to the invention.)

The pipe T-member 16 is connected to the pneumatic side 8 of a hydropneumatic cylinder 7 through a pipe 17.

The hydraulic side 9 of the hydropneumatic cylinder 7 is connected through pipe 18 to the hydraulic armatures of the electromagnetic valve system 4 of the automatic transmission 3.

The push start gear and the friction clutch of the automatic transmission 3 must be engaged, and the electromagnetic valve 6 must be actuated to push start the engine 12. This is performed by a control unit 2.

The operation of the control unit, i.e. the execution of the order of the bus driver, can be initiated by manually actuating an electrical switch 1.

For the careful starting of the engine 12 it is recommended to establish the connection between the crankshaft and the output shaft of the automatic transmission 3 when the vehicle is already properly in motion, and the connection must be terminated as soon as the engine has started. The speed of the crankshaft of the engine 12 and that of the outlet shaft of the automatic transmission 3 have to be measured for this purpose.

It is more convenient to measure the speed of the camshaft instead of the speed of the crankshaft of the engine 12, thus an angular velocity sensor 10 is attached to the crankshaft of the engine 12. The output signal of the sensor is connected to an input of the control unit 2.

The speed deviation between the camshaft and camshaft may be taken into account in the control unit 2.

An angular speed measuring sensor 11 is connected to the output shaft of the automatic transmission 3, or more exactly to the drive shaft of the speedometer. The electrical output of this sensor is also connected to one of the inputs of the control unit 2, so that the difference in speeds may be taken into consideration.

Figure 2:
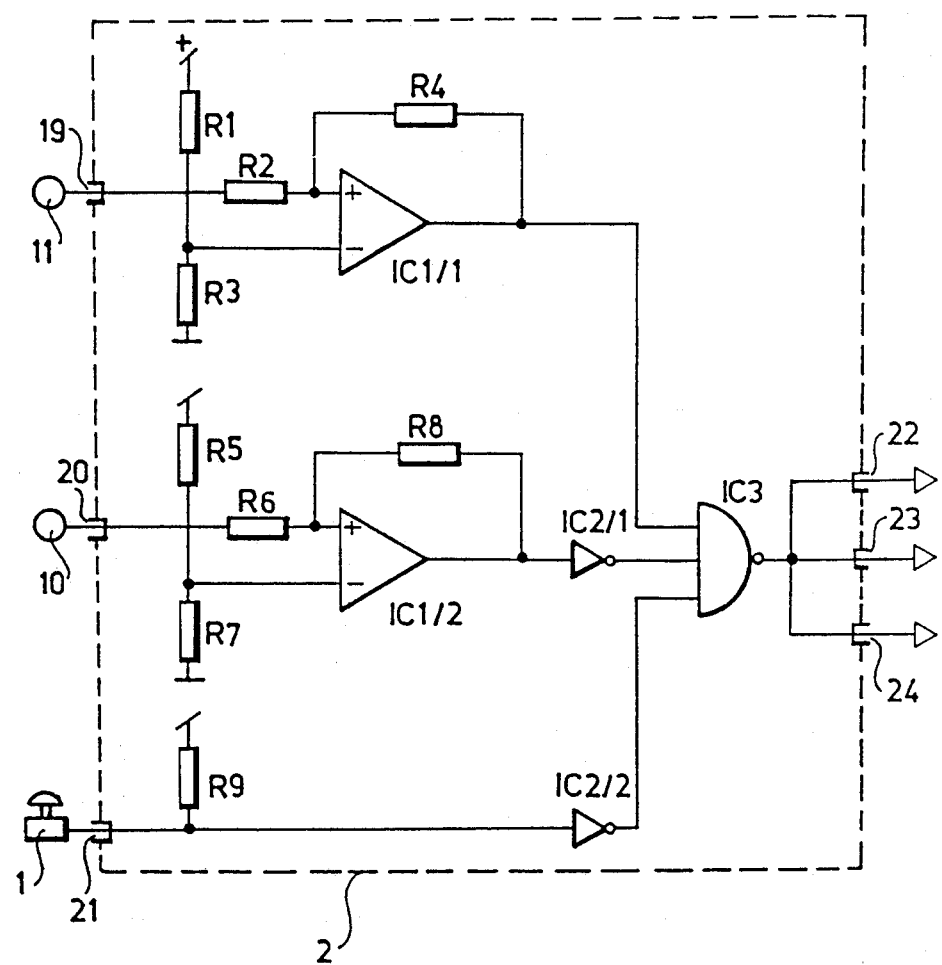
FIG. 2 is a schematic connection diagram of the control unit.

An embodiment of the control unit 2 is shown in FIG. 2. The electronic components that are employed are as follows according to the designation of the IC catalog of the Müszaki Könyvkiado (Hungarian publisher): IC1/1, IC1/2 are IC1 process amplifiers containing process units type LM 324. IC2/1 and IC2/2 are IC2 negative (six) containing negators type SN 74 LS 06. IC3 is a three-inlet NAND gate containing elements of type SN 74 LS 10.

The input 19 of the control unit 2 receives the signal from the angular velocity sensor 11. This is connected to one input of IC1/1 through a resistor R2. This input is also connected through a positive coupling including resistor R4 to the outlet of the IC1/1 unit. A voltage divider composed of R1 and R3 is connected to the other input of the IC1/1 unit.

The input 20 of the control unit 2 receives the signal of the angular velocity sensor 10. The input 20 is connected to one of the inputs of the IC1/2 unit through the resistor R6, which is also connected to the output of IC1/2 through the positive coupling containing resistor R8. The other input of IC1/2 is connected to the voltage divider composed of resistors R5 and R7.

The output of IC1/1 is connected directly, while that of IC1/2 through IC2/1 to one input each of the NAND gate IC3 having three inputs. The third input to the NAND gate IC3 is connected to the input 21 of the control unit 2 through IC2/2, and it is also connected through resistor R9 to the positive pole of a supply voltage. Input 21 receives the signal from the switch 1.

The output of the NAND gate IC3 is connected to outputs 22, 23 and 24 of the control unit 2. Output 22 controls the friction clutch, output 23 controls the solenoid of the electromagnetic valves shifting the push starting gear of the automatic transmission 3, while output 24 controls the solenioid of the electromagnetic valve 6 through a power amplifier, each not shown on the diagram.

The apparatus built in accordance with the invention operates as follows.

When the driver is compelled to push the engine, he will transmit a signal to input 21 of the control unit 23 by actuating the switch 1.

The angular velocity sensor 10 of the engine 12 does not deliver a signal as yet, however, a signal is available after the IC2/1 unit.

When the velocity of the pushed vehicles reaches the required level, the NAND gate IC3 produces an output signal on the basis of the signal received from the angular velocity sensor 11, that of the outlet signal of IC2/1, and of the manual switch 1. This signal is transmitted through outputs 22, 23, 24 to the corresponding solenoid of the electromagnetic valve system 4 of the automatic transmission 3 and to the solenoid of valve 6.

The solenoid valve 6 which interconnects through the T connection 16 of the compressed air system 5 to the pneumatic space 8 of the hydropneumatic cylinder 7. Thus, the compressed air stored in the container 14 flows into the pneumatic space 8 displacing the hydraulic liquid from the hydraulic space 9 and forces it to flow to the hydraulic armatures of the solenoid valve system 4.

The corresponding valves of the solenoid valve system 4 operated by the hydraulic liquid delivered from the hydraulic space 9 will shift-in the second gear, the push starting gear in our case, and the friction clutch. Thus a firm connection is produced between the crankshaft of engine 12 and the outlet shaft of the automatic transmission. If the vehicle continues to be pushed or pulled, the wheels will turn the crankshaft of the engine 12 so that it may be push started.

As soon as the engine 12 begins to run, its speed increases. At that stage the firm connection between the wheels and the crankshaft of the engine 12 should be terminated. At a preselected engine speed the signal of the angular velocity sensor 10 changes the output signal of the IC2/1 unit, whereupon the output signal of the NAND gate IC3 ceases, so that the solenoids of the solenoid valve system 4 and solenoid valve 6 will be deenergized. The friction clutch is thus released, the second gear is shifted out and the pneumatic space 8 is discharged by solenoid valve 6. Thus the connection between the engine 12 and the wheels of the vehicle is terminated, so that the crankshaft may turn freely.

The above described embodiment is considered as a preferred embodiment of the invention, because once the driver has started the procedure the engagement and disengagement of the transmission gear are carried out automatically.

The angular velocity sensors may be omitted in a most simple embodiment of the present invention. In that case engagement of the transmission gear has to be performed by manual switching while disengagement is achieved either by this manual switch, or by pushing the cruise controller into neutral.

As the disengagement of the connection between the wheels and the engine is the more critical procedure, an angular velocity should be installed in the engine in the case of a more sophisticated embodiment.

It is clear that the angular velocity sensors need not be connected directly to the very component part, the speed of which is to be measured. Thus for example the angular velocity sensors used with anti-blocking brake systems may be substituted for the sensor needed at the outlet shaft of the automatic transmission.

The invention can also be used advantageously in a special case. With certain types of automatic transmissions the outlet shafts are mechanically locked in the parking position. If the transmission gear is not outfitted with such a locking device, the security against unwanted moving of the vehicle in the parking position may be improved by actuating the manual switch, because in this case the control unit will engage the transmission upon movement of the vehicle, however, since no fuel is delivered the breaking effect will previl.

We claim:

1. In a motor vehicle having an internal combustion engine, a hydrodynamic transmission including a friction clutch and shift gears, a solenoid valve system for controlling said shift gears and said friction clutch, and a compressed air system including a compressed air vessel, a push-starting control system which comprises,
- (a) a hydropneumatic actuator having a pneumatic space and a hydraulic space,
- (b) a solenoid pressurizing valve for connecting said pneumatic space to said compresed air vessel, for pressurizing said hydraulic space,
- (c) a push-start control system for controllably actuating said solenoid valve system and said solenoid pressurizing valve,
- (d) said control system including manually operable switch means and means for sensing the speed of selected vehicle drive components,
- (e) said control system being operable, upon actuation of said manually operable switch means and the sensing of a predetermined speed of said selected drive components, to cause (i) actuation of said pressurizing valve, (ii) engagement of said friction clutch, and (iii) engagement of predetermined push-start gears of said transmission.

2. The control system of claim 1, further characterized by
- (a) said control system including means responsive to the sensing of a predetermined second speed of selected drive components to cause (i) disengagement of said friction clutch, (ii) disengagement of the push-start gears, and (iii) depressurizing of said pneumatic space.

3. The control system of claim 2, further characterized by
- (a) said control system including first and second sensors for sensing respectively the speed of a transmission output shaft and the speed of the engine,
- (b) said push-start system being activated in response to sensing of a predetermined minimum speed of said output shaft and de-activated in response to sensing of a predetermined maximum speed of said engine.

* * * * *